July 29, 1952    H. L. GRIFFIN    2,604,780
APPARATUS FOR FILLING CONTAINERS
Original Filed May 9, 1940    4 Sheets-Sheet 2

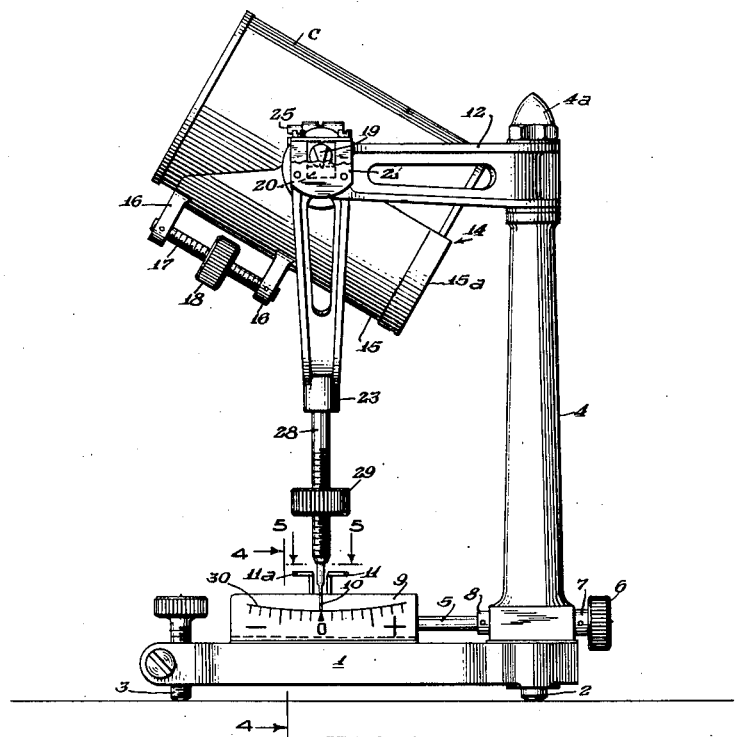

INVENTOR.
Harry L. Griffin
BY Mock & Blum
ATTORNEYS

July 29, 1952          H. L. GRIFFIN          2,604,780
APPARATUS FOR FILLING CONTAINERS
Original Filed May 9, 1940          4 Sheets-Sheet 3

INVENTOR.
Harry L. Griffin
BY Mock & Blum
ATTORNEYS

July 29, 1952        H. L. GRIFFIN        2,604,780
APPARATUS FOR FILLING CONTAINERS
Original Filed May 9, 1940        4 Sheets—Sheet 4

Harry L. Griffin INVENTOR.
BY Mock & Blum
ATTORNEYS

Patented July 29, 1952

2,604,780

UNITED STATES PATENT OFFICE 2,604,780

APPARATUS FOR FILLING CONTAINERS

Harry L. Griffin, Rockville Centre, N. Y., assignor to The Nestlé Company, Inc., a corporation of New York Application November 15, 1944, Serial No. 563,478

1 Claim. (Cl. 73—52)

My invention relates to mechanism for testing the weight of the filling of a container. The filling may be evaporated milk, sweetened or unsweetened, paints, oils, and powdered or solid or liquid material of any kind.

Another object of the invention is to test the correctness of the filling of the container, or to control the filling of the container, while the container is held in fixed position in a cradle which is mounted to turn about a horizontal axis. When I refer to a cradle, I include weights which may be fixed to or which may be adjustably connected to the cradle or to an arm or arms thereof. When the correctness of the filling of a container is being tested, the common center of gravity of the filled container and of the cradle may be located on the predetermined axis of rotation, if the container has been correctly filled, or said common center may be located directly above or directly below the axis of rotation. In said testing position the center of gravity of the container itself may be located on the axis of rotation, or directly vertically above or directly vertically below the axis of rotation, so that the weight of the container per se will exert no turning force. In said testing position, the center of gravity of the empty container per se, may be laterally offset relative to the axis of rotation, but this lateral offset is so slight as to eliminate any substantial inaccuracies which may result from differences in the weights of respective containers. Therefore, in making the test, the weight of the container exerts no turning movement, or substantially no turning movement, relative to said predetermined axis of rotation. The invention relates particularly to cans or other containers of symmetrical shape, in which the center of gravity of the container coincides with its geometrical center. However, the invention applies to containers of irregular shape.

Another object of the invention is to provide means whereby the moment which is exerted by the weight of the contents of the container is caused to regulate the action of a filling machine or of part of a filling machine, such as a valve of the filling machine.

Another object of the invention is to cause the can or container to turn about an axis which is located below the center of mass of the can, under the moment of the filling material of the container, so that the container is moved sharply from a predetermined normal position to a second position, when the weight of the contents exceeds a predetermined limit.

Other objects of the invention will be set forth in the following description and drawings which illustrate several preferred embodiments thereof.

Fig. 1 is a side elevation of the first embodiment of the invention.

Fig. 2 is a top plan view of Fig. 1.

Figure 3:
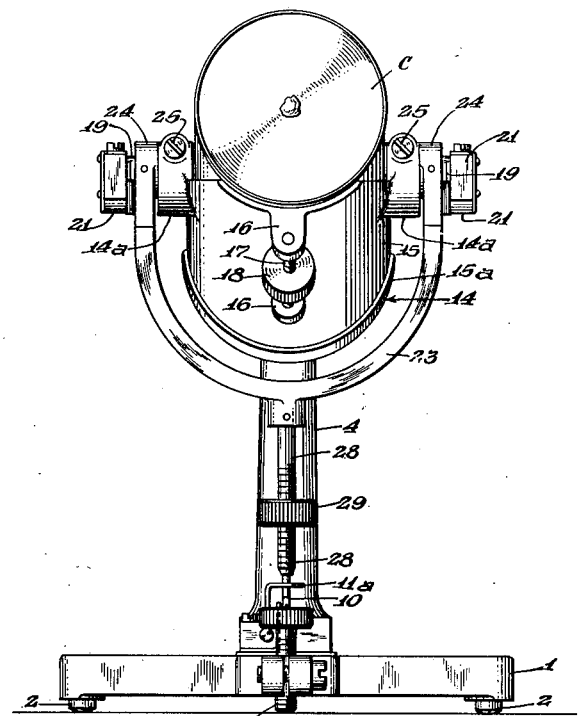
Fig. 3 is a front elevation taken at the left-hand side of Fig. 1.

In filling bottles, cans and other containers with liquid or solid material, it is necessary to perform the filling operation very accurately, as otherwise there is a waste of material. For many purposes, as in filling cans with unsweetened evaporated milk, the can is not completely filled, as complete filling would interfere with the processing of the milk in the can. In other cases, as for example in filling cans with sweetened evaporated milk, it is necessary to fill the can completely. Experience has shown that the valve regulation of filling machines is frequently inaccurate and that accurate adjustment of such valves cannot be maintained over long periods of time. It has therefore been the practice to check up the accuracy of the filling machine by weighing selected cans or other containers. However, the weights of respective cans or other containers may vary substantially, although such cans or other containers are made by the same machine and as uniformly as possible. For example, in making cans for packing evaporated or condensed milk, the weight of the sheet metal may vary. This variation in weight makes it even more difficult to determine whether the can has been accurately filled.

According to the first embodiment of my invention, the can is turnably supported so that the can can turn around an axis which passes through the center of gravity of the empty can. This axis of rotation is preferably horizontal. The effect of differences in the weights of respective cans is thus eliminated. While the weight of one can may differ substantially from the weight of another can, it can be assumed, for practical purposes, that the center of gravity of an empty can coincides with its center of volume, because the effect of differences in thickness of the wall of a can is insignificant. The same applies to bottles and containers which are made of glass or other materials, and it is to be understood that whenever I refer to a can, I include any type or shape of container, and I include containers which are made of any material.

According to another embodiment of my invention the filled can, which is wholly or partially filled, is tested while the common center of gravity of the filled can and of the cradle is higher than the horizontal axis of rotation of the cradle.

According to another embodiment of the invention, the can is supported so that its center of mass is offset laterally relative to the axis around which the can is mounted to turn. Said axis is preferably, but not necessarily, horizontal. The weight of the empty can thus exerts a moment on the can and its turnable support, and said moment can be counter-balanced by suitable biasing means. When the can is filled either partially or wholly, the weight of the filling material increases said turning moment. The turnable support of the can may be biased or balanced against said moment of the filling material so that the can will remain in a predetermined position until the weight of the filling material exceeds a predetermined limit. Whenever I refer to a filled can, I include a can or other container which has been filled either partially or wholly. The axis around which the can is mounted to turn may pass through the center of gravity of the can, or said axis of rotation may be located below the center of gravity of the can.

Figure 9:
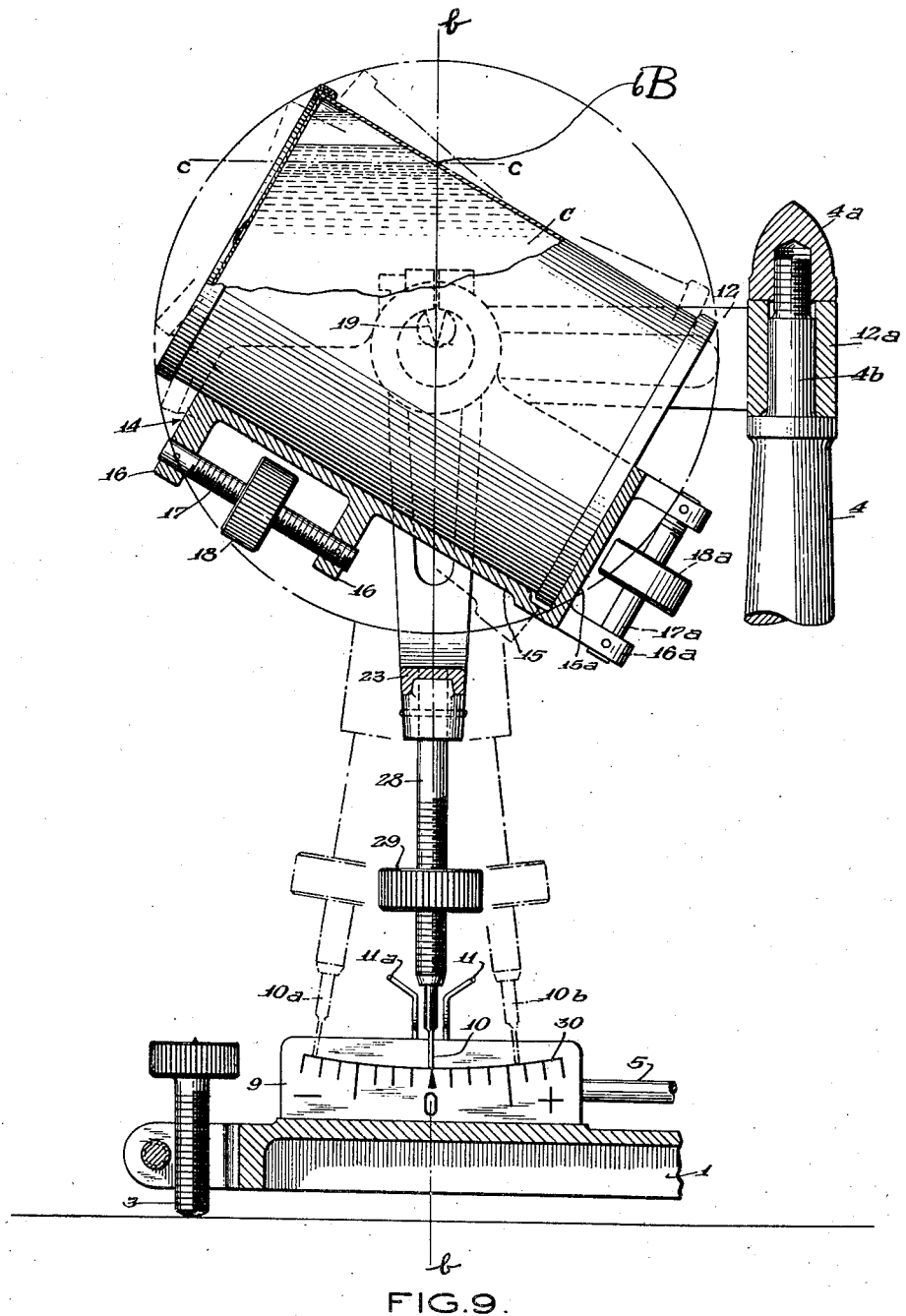
Fig. 9 is a side elevation, partially in section, showing a first modification.

The base 1 rests upon a pair of fixed studs 2 and upon a single adjustable screw 3, which is a leveling screw. A column 4 is connected to the base 1 or is integral therewith. The base 1 is leveled so that the column 4 is held vertical. As shown in Fig. 9, the arm 12 has a sleeve 12a in which a reduced upper end-portion 4b of the column 4 is located. The top reduced end-portion of the part 4b is threaded, and a clamping cap 4a is connected to said threaded end-portion. This cap 4a clamps sleeve 12a rigidly against a shoulder of the column 4. The arm 12 has the yoke shape which is shown in Fig. 2. At each end thereof the arm 12 has a depending yoke 21. Each yoke 21 is associated with a knife-edge member 19.

Figures 6, 7:
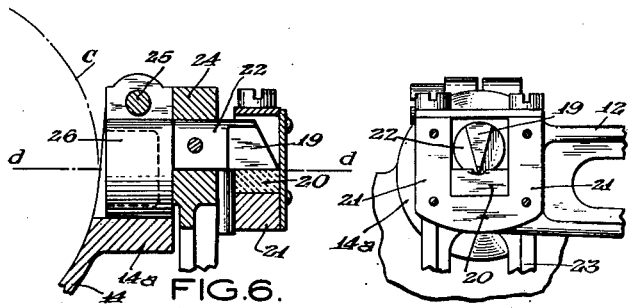
Fig. 6 is a section on 6—6 of Fig. 2.
Fig. 7 is an elevation on 7—7 of Fig. 2.
Figures 5, 8:
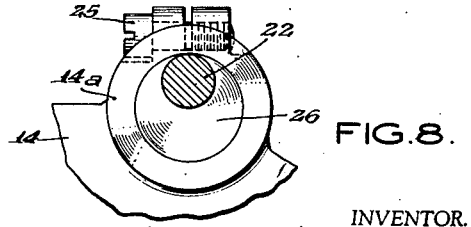
Fig. 5 is a section on 5—5 of Fig. 1.
Fig. 8 is a section on 8—8 of Fig. 2.

As shown in Figs. 6 and 7, each knife-edge member 19 is integral with a pivot pin 22. The sharp edge of each knife-edge member 19 abuts the wall of a recess of a hardened steel insert 20, which is suitably connected to the respective yoke 21, by a drive fit or the like. A depending yoke-shaped arm 23 has hollow bosses 24, in which the pivot pins 22 are located. Said bosses 24 are rigidly connected by set screws or the like to the respective pivot pins 22. The cradle 14 has bosses 14a. These bosses are split bosses, and the ends of each boss can be tightened by means of a tightening crew 25, so as to clamp said bosses 14a to the respective enlarged extensions 26 of the respective pivot pins 22. The longitudinal axis of each pivot pin 22 is offset relative to the longitudinal axis of its enlargement 26. The split bosses 14a and the tightening screws 25 make is possible to adjust the inclination of the longitudinal axis of the cradle, while the pointer 10 is maintained in the normal vertical position. The pointer rod 28 is connected to or it is integral with the arm 23. A part of the pointer rod 28 is threaded, and the weight 29 is adjustably mounted on said threaded portion. The pointer 10 of the pointer rod 28 is associated with a fixed scale 9. The cradle 14 and the arm 23 are thus supported on the sharp edges of the members 19, which are turnably supported on the inserts 20 of the depending yokes 21 of the arm 12.

Figure 4:
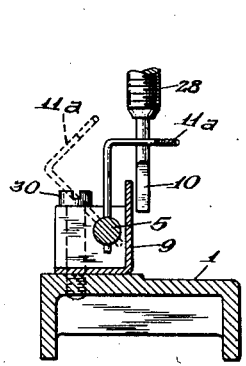
Fig. 4 is a section on 4—4 of Fig. 1.

As shown in Fig. 4, said scale 9 is of angular shape, and it is connected to the base 1 by means of screws 30. The shaft 5 is mounted turnably in a bore of the column 4, and it has the usual bearing collars 7 and 8. The shaft 5 is provided with a knob 6. The shaft 5 also has the angular stops 11 and 11a, which can hold the pointer 10 of the pointer rod 28 from moving, when said pointer is in its vertical position.

The leg 15 of the cradle 14 is provided with brackets 16, to which a threaded rod 17 is connected. The weight 18 is adjustable on the threaded rod 17.

The can C is located so that its geometrical center, which in this case coincides with the center of mass or center of gravity of said can, is located on the axis of rotation of the cradle 14, which is indicated by the line $d$—$d$ in Fig. 6. The sharp edges of both knife-edge members 19 coincide with this line $d$—$d$.

The embodiment of Fig. 9 is substantially the same as that of Fig. 1, save that in the embodiment of Fig. 9, the leg 15a of the cradle has brackets 16a, to which a threaded rod 17a is connected. The weight 18a is adjustably mounted on the threaded rod 17a. Fig. 9 shows a sealed can which has been correctly but partially filled, although this device can be used for determining whether a can has been completely filled. I will first consider the case in which it is desired partially to fill a can with a predetermined quantity of filling material. In such case, if pointer 10 is vertical, the level of the filling material may be respresented by the line $c$—$c$ or by the horizontal line or plane which passes through the point 6B. The line $b$—$b$ is a vertical line which passes through the horizontal axis of rotation of the cradle. The center of gravity of the empty can is on the axis of rotation. If a can has been partially filled so that the level of the filling material is represented by the horizontal line or plane which passes through the point 6B, the weight 18, or the weights 18 and 18a are adjusted, so that the common center of gravity of the can and of the filling material and of the cradle is located on the vertical line $b$—$b$, if the can has been correctly filled. Said common center of gravity is located directly vertically below the axis of rotation. The vertical distance between said common center of gravity and said axis of rotation is regulated by adjusting the weight 29. After the apparatus has thus been adjusted, the test can is located on the cradle while the pointer 10 is held vertical by the stops 11 and 11a. If the test can has been underfilled, the common center of gravity of the can and of the filling material and of the cradle is located to the right of the vertical line $b$—$b$ so that when the stops 11 and 11a release the pointer 10, said pointer will turn towards the broken-line position indicated by 10a. If the test can has been overfilled, said center of gravity will be shifted to the left of the line $b$—$b$ so that the pointer will swing towards the position indicated by 10b, when the stops release the pointer 10. The center of gravity of the cradle can be vertically adjusted by shifting the weight 29. If it is desired to test whether a can has been completely filled, a completely filled can is first located in the cradle. The weights 18 and 18a are then adjusted so that the common center of gravity of the empty can and of the filling material which completely fills the can, and of the cradle, is located vertically below the axis of rotation. The can which is to be tested is then placed on the cradle. If the test can has not been completely filled, the pointer 10 will swing towards the position 10a, when the stops are released.

Figure 10:
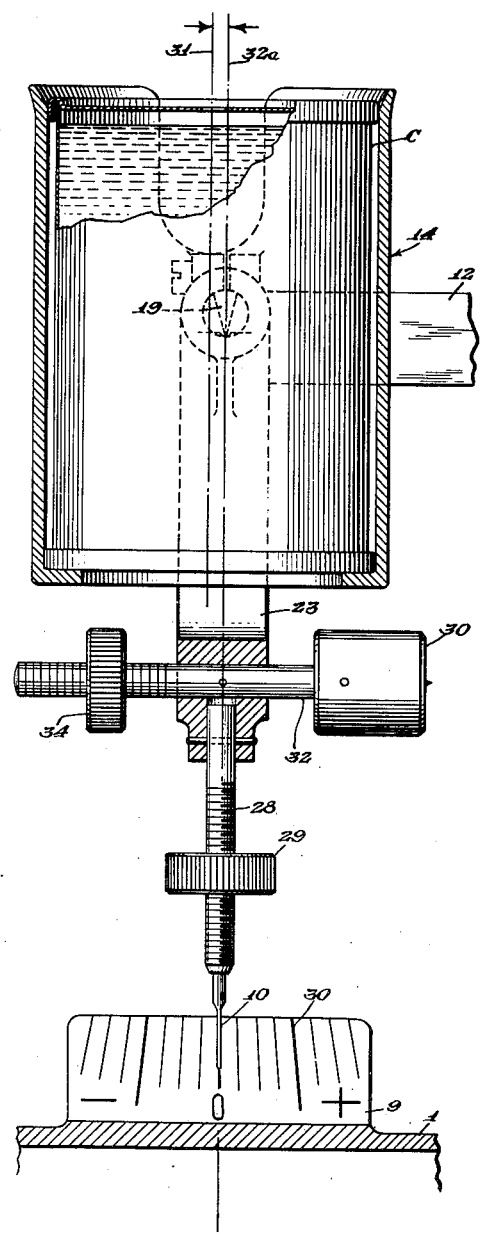
Fig. 10 is a side elevation, partially in section, showing a second modification.

In Fig. 10, the longitudinal axis of the empty can, which passes through its center of gravity, is indicated by the line 31. When the can is in the testing position shown in Fig. 10, the center of gravity of the can is at the same level as the horizontal axis of rotation of the cradle. The axis of rotation of the cradle is located on the line 32a, which is offset laterally relative to the center of gravity of the can. Otherwise, the construction of the cradle is the same as that previously illustrated. The arm 23 of the cradle is provided with a lateral arm 32 which has a fixed or adjustable weight 30 at one end thereof. The adjusting weight 34 can be longitudinally shifted on the rod 32.

The embodiment of Fig. 10 can also be used to test whether a can has been partially filled with the predetermined quantity of filling material, or whether the can has been completely filled. This test can be made prior to or after the can has been sealed. I will first take up the case in which the can is to be partially filled with a predetermined quantity of filling material. A can is filled with said predetermined quantity and it is located in the cradle. When the pointer 10 is held in the vertical position shown in Fig. 10, its vertical axis is represented by the line 32a which passes through the center of rotation of the cradle. The line 31 passes through the center of gravity of the empty can and also through the center of gravity of the filling material. When the pointer 10 is vertical, the top surface of the filling material is in a horizontal plane. The weight 34, or the weights 34 and 30 are then horizontally adjusted, so that the common center of gravity of the empty can and of the filling material and of the cradle is located on the line 32a. The lateral distance between the lines 31 and 32a is relatively small.

The adjusted clockwise moment of the cradle then balances the counterclockwise moment of the can and of its filling. Said adjusted clockwise moment of the cradle is designated as the balancing moment. I determine said balancing moment by making a test with a can or container which is one of a series of commercially similar cans or containers.

In the embodiment of Fig. 10, if the can under test has been underfilled, the balancing moment exceeds the moment of the filling in said narrow zone, and pointer 10 will turn clockwise. This is because the common center of gravity of the underfilled can and of the cradle, is located at the right of line 32a.

In the embodiment of Fig. 10, if the can under test has been overfilled, the balancing moment is less than the moment of the filling in said narrow zone, and pointer 10 will turn counterclockwise.

In the various embodiments, the longitudinal axis of the filled container is inclined to the horizontal and vertical planes, when the filled container is in stable equilibrium.

The vertical distance between said common center of gravity and the axis of rotation is regulated by adjusting the weight 29. As an example, and without limiting the invention, the can which is to be tested may have a height of 3⅞ inches, and a diameter of 2⅜ inches, and such can is to be filled with 14½ ounces of unsweetened evaporated milk. In such case the lateral distance between the lines 31 and 32a should not exceed about ⅛ inch. The variation in weight of the zone of the empty can which is located between the vertical planes which pass through the lines 31 and 32a is so slight as to eliminate any slight error which may thus arise. Hence the moment of the filling material greatly exceeds the moment of the can, and the moment of the filling material determines the direction in which the can turns in unison with the cradle, from the initial test position. Due to the adjustment of the apparatus, the filling material shifts the cradle from its initial test position, only if the volume of said filling material varies from a predetermined value.

In order to test whether a can has been completely filled, using the embodiment of Fig. 10, a completely filled can is located in the cradle and the weight or weights of the cradle are then adjusted so that the common center of gravity of the can and of the filling material which completely fills the same, and of the cradle, is located on the line 32a. If the can which is being tested is incompletely filled, said common center of gravity is located to the right of the line 32a and the pointer 10 will swing to the left.

The cradle will turn until the common center of gravity of the can and of its filling material and of the cradle will be located directly below the axis of rotation. The arc through which the cradle thus turns is regulated by regulating the vertical distance of the center of gravity of the cradle below the axis of rotation. The scales of Figs. 9 and 10 therefore give a direct reading of the difference between the predetermined filling of the can, either total filling or partial filling, and the filling of the can which is being tested.

I have shown numerous preferred embodiments of my invention, but it is clear that numerous changes and omissions can be made without departing from its spirit.

This application is a division of my application Serial No. 334,104, filed May 9, 1940. This has been issued as No. 2,362,997, dated November 21, 1944.

I claim:

For use in testing the weight of the filling of a rigid container which has a longitudinal axis on which the center of gravity of said container is located, a cradle-support, a cradle which is pivotally connected to said cradle-support by pivot means, said pivot means having a transverse and substantially horizontal pivot axis, said cradle having walls shaped and adapted to support said container and to maintain said container in testing position which is fixed relative to said cradle while said cradle is turned around said pivot axis, said cradle being turnable to a position in which said longitudinal axis is vertical, and said walls being shaped and adapted then to support said container in said fixed testing position, said longitudinal axis being offset laterally relative to said pivot axis and the center of gravity of said container being at substantially the same level as said pivot axis when said container is in said testing position and the longitudinal axis of said container is vertical, the horizontal lateral distance between said vertically disposed longitudinal axis and said pivot axis being less than the width of said container when it is in testing position, a weight which is located laterally relative to said pivot axis, said weight being laterally adjustably connected to said cradle, and another weight which is located under said cradle and is connected to said cradle, said other weight biasing said cradle to remain in a normal position in which the longitudinal axis of said container is vertical in its test position.

HARRY L. GRIFFIN.

REFERENCES CITED

The following references are of record in the file of this patent:

UNITED STATES PATENTS

| Number | Name | Date |
|---|---|---|
| 501,401 | Billig | July 11, 1893 |
| 557,140 | Munson | Mar. 31, 1896 |
| 766,535 | Sharp | Aug. 2, 1904 |
| 992,513 | McAnulty et al. | May 16, 1911 |
| 1,099,917 | Dungan et al. | June 16, 1914 |
| 1,136,611 | Pomeroy | Apr. 20, 1915 |
| 1,168,727 | Jenigar | Jan. 18, 1916 |
| 1,565,118 | Stugard | Dec. 8, 1925 |
| 2,094,806 | Murdoch | Oct. 5, 1937 |
| 2,172,006 | Buckner et al. | Sept. 5, 1939 |
| 2,280,614 | Ayars | Apr. 21, 1942 |
| 2,305,102 | O'Neil | Dec. 15, 1942 |
| 2,362,997 | Griffin | Nov. 21, 1944 |

FOREIGN PATENTS

| Number | Country | Date |
|---|---|---|
| 69,641 | Austria | Aug. 25, 1915 |
| 452,826 | Great Britain | Aug. 31, 1936 |
| 552,297 | Germany | June 11, 1932 |